United States Patent [19]

Dunn et al.

[11] 4,373,459
[45] Feb. 15, 1983

[54] ELECTRONICALLY CONTROLLED SEWING MACHINE ARRANGED TO SEW A SEQUENCE OF STITCH PATTERNS

[75] Inventors: William H. Dunn, Frankford Township, Sussex County; Stephen A. Garron, Elizabeth; Leonard I. Horey, West Orange; John W. Wurst, Chester Township, Morris County, all of N.J.

[73] Assignee: The Singer Company, Stamford, Conn.

[21] Appl. No.: 407,023

[22] Filed: Aug. 11, 1982

[51] Int. Cl.³ .............................................. D05B 3/02
[52] U.S. Cl. ............................................... 112/158 E
[58] Field of Search ........... 112/158 E, 121.11, 121.12

[56] References Cited

U.S. PATENT DOCUMENTS

| | | | |
|---|---|---|---|
| 4,122,786 | 10/1978 | Tanimoto et al. | 112/158 E |
| 4,142,473 | 3/1979 | Itoh | 112/158 E |
| 4,200,048 | 4/1980 | Makabe et al. | 112/158 E |
| 4,237,803 | 12/1980 | Nakanishi et al. | 112/158 E |
| 4,266,493 | 5/1981 | Hanyu et al. | 112/158 E |
| 4,280,424 | 7/1981 | Carbonato et al. | 112/158 E |
| 4,334,486 | 6/1982 | Toshiaki et al. | 112/158 E |

*Primary Examiner*—Peter P. Nerbun
*Attorney, Agent, or Firm*—David L. Davis; Robert E. Smith; Edward L. Bell

[57] ABSTRACT

An electronically controlled multiple pattern sewing machine is provided with the capability of sewing a repetitive sequence of patterns. The sewing machine operator selects, one by one, the patterns desired to be sewn and these are stored in a temporary memory in the order of their selection. In addition, each of the patterns may be modified such as by providing double feed, bight mirror, feed mirror, bight override and/or feed override. The arrangement also allows the operator to replace a previously selected pattern in a string with a different pattern at the same place in the string.

6 Claims, 6 Drawing Figures

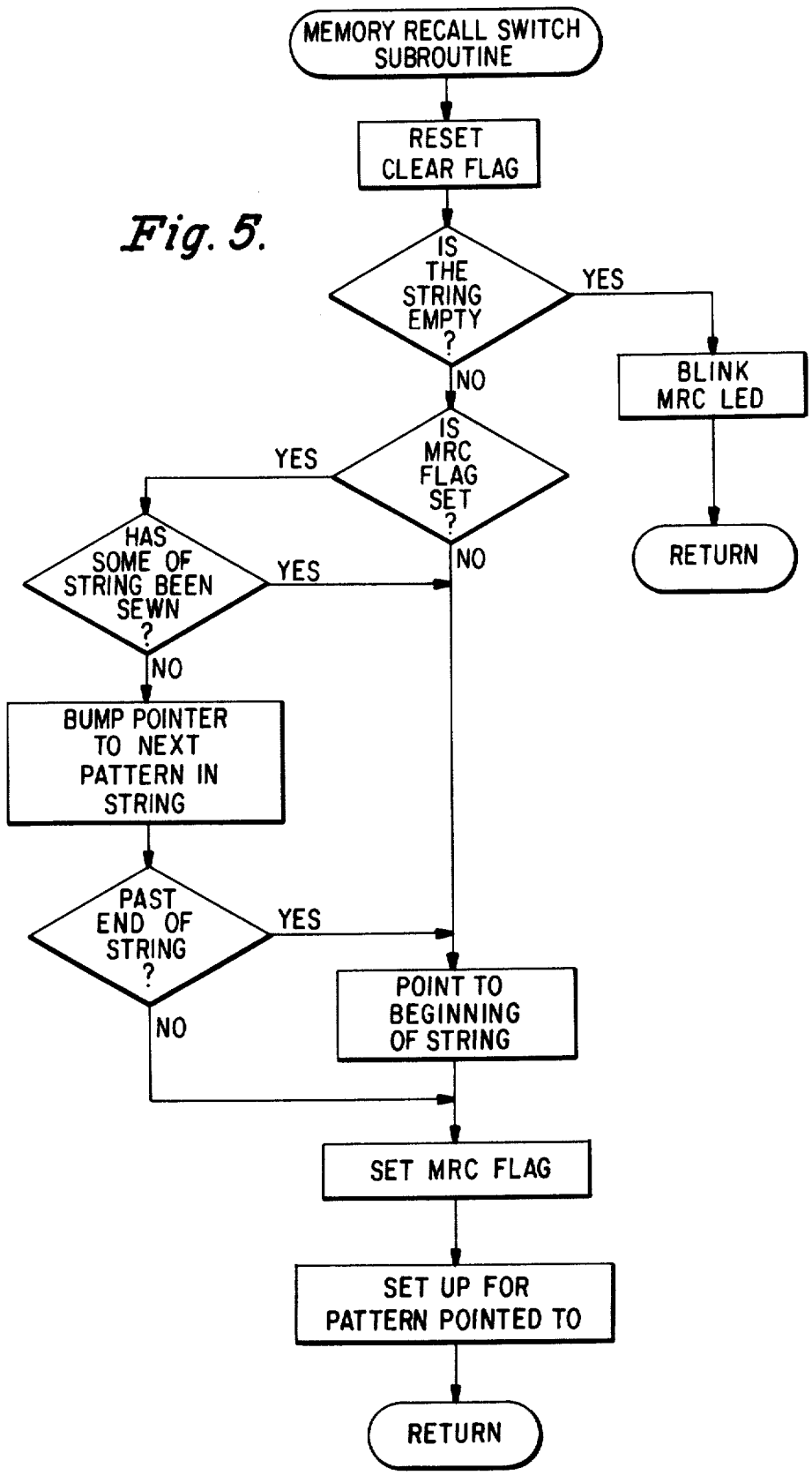

ELECTRONICALLY CONTROLLED SEWING MACHINE ARRANGED TO SEW A SEQUENCE OF STITCH PATTERNS

DESCRIPTION

Background of the Invention

This invention relates to sewing machines and, more particularly, to electronically controlled sewing machines.

Sewing machines employing sophisticated electronic technology for the storage and subsequent retrieval of stitch pattern information for a multiplicity of patterns have enjoyed great commercial success in recent years. One great advantage of the use of an electronically controlled sewing machine is in its simplicity of operation and control, as perceived by the user. With the recent availability of relatively low cost microcomputers, electronically controlled sewing machines incorporating such a device have greatly increased the versatility of control afforded to the sewing machine operator. One aspect of such control has been to allow the operator to program a sequence, or string, of selected stitch patterns which are then sewn in the order of their selection. However, a disadvantage to all of the known arrangements for effecting the pattern stringing function is that if the operator desires to replace a single entry in the string, the entire string must be reentered into the sewing machine. Additionally, the known pattern stringing systems only allow a programmed stitch pattern to be sewn, without allowing any alteration thereto.

It is therefore a primary object of the present invention to provide an improved electronically controlled sewing machine having an arrangement for sewing a sequence of stitch patterns.

It is a further object of the present invention to provide such a sewing machine wherein each entry within a string of stitch patterns to be sewn includes the pattern identity as well as selective pattern alteration functions associated therewith.

It is another object of this invention to provide such a sewing machine wherein a selected individual entry in the string may be replaced with another entry.

Summary of the Invention

The foregoing and additional objects are attained in accordance with the principles of this invention by providing an electronically controlled multiple pattern sewing machine including a central control system having a memory storing stitch pattern information, pattern selection input means for transmitting to the central control system a pattern selection signal identifying a selected pattern to be sewn by the sewing machine, alteration function input means for transmitting to the central control system selected pattern alteration function commands associated with a selected pattern on an individual basis to cause the central control system to alter the stored stitch pattern information in accordance with the selected pattern alteration function commands so as to sew a selectively altered version of a selected pattern, and pattern string memory means for storing a sequence of entries each comprising a respective pattern selection signal and associated selected pattern alteration function commands.

In accordance with an aspect of this invention, the sewing machine further includes means for replacing a selected individual entry in the pattern string memory means with another such entry.

BRIEF DESCRIPTION OF THE DRAWINGS

The foregoing will be more readily apparent upon reading the following description in conjunction with the drawings wherein:

FIGS. 4, 5 and 6 are flowcharts of subroutines for operating the microcomputer of FIG. 2 in accordance with the principles of this invention.

DETAILED DESCRIPTION

Figure 1:
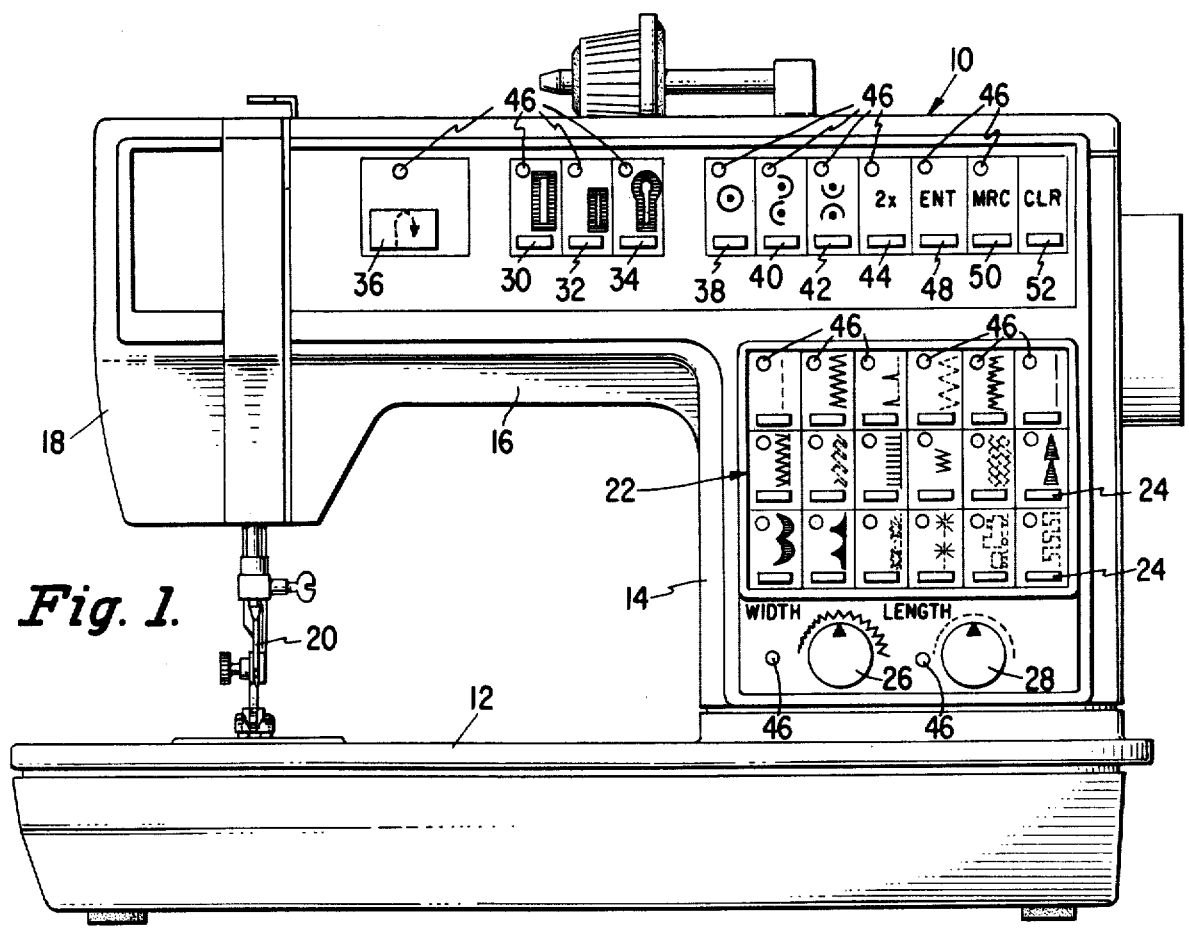
FIG. 1 is a front elevational view of an illustrative sewing machine in which this invention may be incorporated.

Referring now to the drawings, wherein like elements in different figures thereof have the same reference character applied thereto, FIG. 1 shows a sewing machine designated generally by the reference numeral 10. The sewing machine 10 includes a work supporting bed 12, a standard 14, a bracket arm 16 and a sewing head 18. The sewing machine stitch forming instrumentalities include a needle 20 capable of being endwise reciprocated and laterally jogged to form zig zag stitches and a work feed dog (not shown) operating upwardly through slots formed in a throat plate on the bed 12 to transport the work across the bed 12 between needle penetrations. The pattern of stitches produced by operation of the sewing machine 10, i.e., the positional coordinates of each stitch penetration, may be influenced, for example, by data stored in a memory unit and extracted in timed relation with the operation of the sewing machine 10, as is well known in the art.

On the front panel of the sewing machine 10 there is provided an input means whereby the operator can effect control of the functions of the sewing machine 10. This input means includes switches and dials whereby the operator may select a pattern to be sewn by the sewing machine 10 as well as effecting modifications, or alterations, to the selected pattern. Pattern selection is effected illustratively through an array 22 of push-buttons switches 24, each of which corresponds to a pattern of stitches, the information for forming which is stored in the memory of the sewing machine 10. Associated with each of the push-buttons switches 24 is a pictorial representation of the pattern as it would be sewn by the sewing machine 10 upon actuation of that switch. The input means also includes a stitch width control (bight override) 26 and a stitch length control (feed override) 28. The controls 26 and 28 each includes a push-button switch which is operator actuated to effect the respective width or length modification and includes a rotary portion for setting the magnitude of the modification. There are also provided push-button switches 30, 32 and 34 for selecting large buttonhole, small buttonhole and round-end buttonhole patterns, respectively. A push-button switch 36 is provided for reverse sewing. Single pattern selection is effected via a switch 38. The mirror image of a pattern in the bight direction is selected via the switch 40 and the mirror image of the pattern in the feeding direction is selected via the switch 42. The switch 44 is utilized for doubling the length of a sewn pattern. Thus, there are illustratively five pattern alteration function commands which may be provided under operator control. These are bight override, feed override, bight mirror image, feed mirror image and double feed.

Indicating means for indicating to an operator the status of each of the various functions which may be selected is also provided on the front panel of the sewing machine 10. Illustratively, this takes the form of a plurality of light emitting diodes (LEDs) 46 each in close proximity to its respective input switch.

In accordance with the principles of this invention, three push-button switches are provided to effect operator control of the pattern stringing function. These three switches are the ENTER (ENT) push-button switch 48, the MEMORY RECALL (MRC) push-button switch 50 and the CLEAR (CLR) push-button switch 52. Of these three push-button switches 48, 50 and 52 only the ENT switch 48 and the MRC switch 50 have associated LEDs 46. Pattern stringing permits the sewing machine operator to select a series of patterns from the repertoire of available patterns, together with desired pattern modifiers, and to enter these selections into a pattern string memory within the machine for subsequent automatic sequenced recall. When the string so programmed is sewn, each selection is reproduced once (or more if multiply entered) in the order selected, and the string may be sewn repeatedly.

Allowable pattern alteration function commands (modifiers) are bight override, feed override, bight mirror, feed mirror and double feed. When override values are mechanically set, such as by the dials 26 and 28, and there is no independent memory for the override values so that the mechanical setting itself retains the override value, then the logic control of the overrides is limited to activating or deactivating them only as programmed for each individual pattern. On the other hand, when override values are retained in an independent memory separate from the operator control, such as described in U.S. Pat. No. 4,177,744, the override values for each of the patterns in the string may also be stored in the pattern string memory. The single pattern modifier operates normally, i.e., it calls for one repetition of the string. Storage in a string of certain patterns and functions is not permitted, such as buttonhole patterns, reverse and single pattern.

Actuation of the CLR push-button switch 52 is effective only if the MRC push-button switch 50 has previously been actuated. A single actuation of the CLR switch 52 signals the logic that the next entry is to replace a previous entry at the same place in the string. A second actuation of the CLR switch 52 causes the logic to erase the entire string.

Actuation of the ENT switch 48 causes the logic to store the indicated pattern and any modifiers then in effect. An entry will always be placed at the end of a string unless either the CLR switch 50 has just been actuated once or the alloted pattern string memory space is full. Actuation of the ENT switch 48 is ignored if the MRC switch 50 has been actuated after a pattern selection has been made or if a non-permitted pattern, such as the buttonhole, is active.

Actuation of the MRC switch 50 causes the logic to invoke the stored string in place of a normal pattern. The operator may confirm the sequence of patterns programmed by successively actuating the MRC switch 50. All panel indicators will then show the pattern and modifiers selected for the respective place in the string. Stepping through the string by successive actuations of the MRC switch 50 is also utilized when the operator desires to replace an individual entry in the string.

Figure 2:
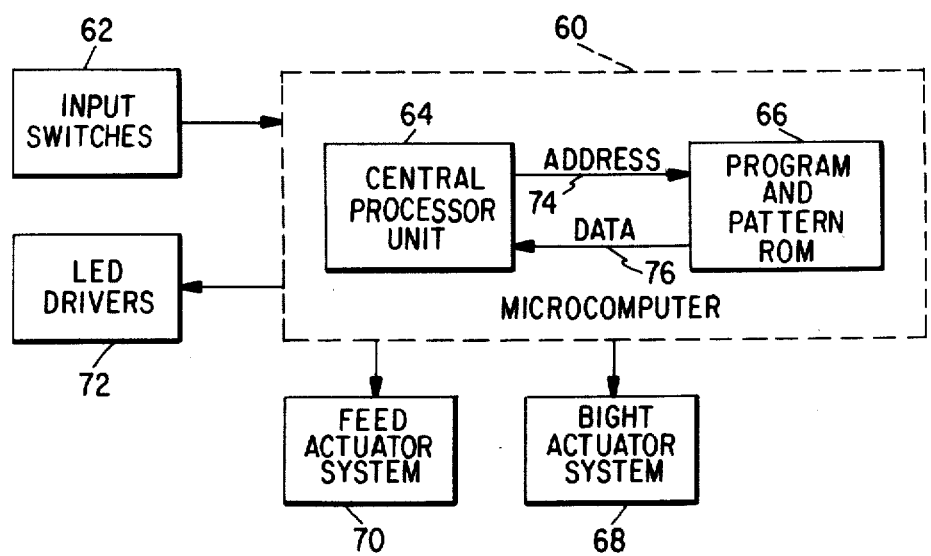
FIG. 2 illustrates a general block diagram of a microcomputer based control system for the sewing machine of FIG. 1.

FIG. 2 shows a general block diagram of a microcomputer-based controller for an electronic stitch pattern sewing machine, which controller may be utilized to control the operation of the sewing machine 10 (FIG. 1) and which operates in accordance with the principles of this invention. Accordingly, the microcomputer 60 receives input signals from the input switches 62 indicative of the functions the sewing machine operator desires to be performed by the sewing machine 10. The input switches 62 may include the pattern selection switches 24 and 30-34 as well as the function switches 26, 28 and 36-52. The microcomputer 60 includes an internal central processor unit (CPU) 64 and a program and pattern ROM 66 the CPU 64 obtains from the ROM 66, in timed relation with the operation of the sewing machine 10, pattern data for controlling the bight actuator system 68 and the feed actuator system 70. The bight actuator system 68 and feed actuator system 70 are similar in construction and are adapted to convert a digital code word from the microcomputer 60 into a mechanical position which locates the sewing machine needle 20 in a conventional stitch forming instrumentality and provides a specific work feed for each needle penetration, respectively, as is well known in the art. The microcomputer 60 also provides signals to the LED drivers 72 to control the illumination of the LEDs 46 (FIG. 1) to indicate the function selected by the sewing machine operator. Illustratively, the microcomputer 60 is a type TMS 7040 Microcomputer manufactured by Texas Instruments wherein the CPU 64 provides addresses to the ROM 66 over the lines 74 and receives in return bytes of data and program over the lines 76.

Figure 3:
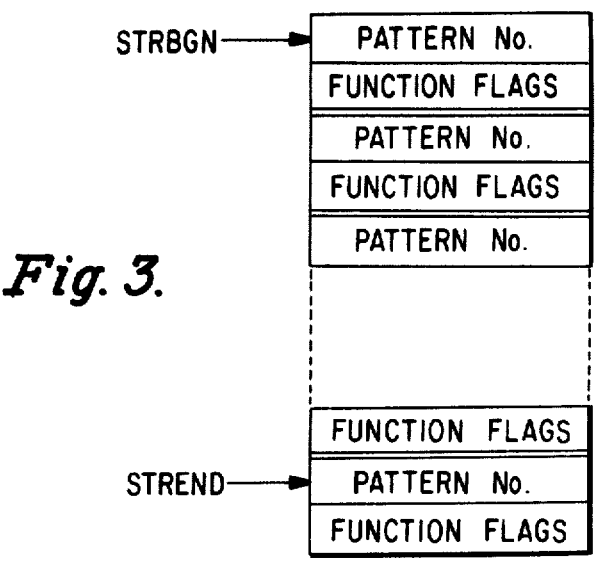
FIG. 3 illustrates a portion of the internal temporary memory of the microcomputer shown in FIG. 2 showing the arrangement of the pattern string memory.

In addition to the ROM 66, the microcomputer 60 also includes read/write memory and registers which the CPU 64 utilizes during execution of its internal program stored in the ROM 66. In accordance with the principles of this invention, a portion of this temporary memory is dedicated as a pattern string memory which is utilized for storing a sequence of entries each comprising a respective pattern selection signal and associated selected pattern alteration function commands. FIG. 3 illustrates the organization of this pattern string memory. As shown in FIG. 3, each entry in the pattern string memory includes two bytes of information. The first byte holds the selected pattern number and the second byte holds the function flags. As discussed above, there are five allowable pattern alteration function commands. Accordingly, five bits of the second byte of each entry correspond to these five functions. The pattern string memory includes a plurality of addressable memory locations arranged in a predetermined order. The address of the first byte of the first entry is designated STRBGN and the first byte of the last entry is designated STREND.

The APPENDIX to this specification illustrates program subroutines for operating the microcomputer 60 to respond to actuation of the ENT switch 48, the MRC switch 50 and the CLR switch 52, as discussed above. This program is written in assembly language for the TMS 7040 microcomputer, and is for a sewing machine having a specific pattern switch configuration slightly different from that illustrated in FIG. 1. However, the operation of the sewing machine 10 in accordance with the program in the APPENDIX is as described above.

It is understood that the program listing in the APPENDIX is only a portion of the entire program stored in the ROM 66.

Figure 6:
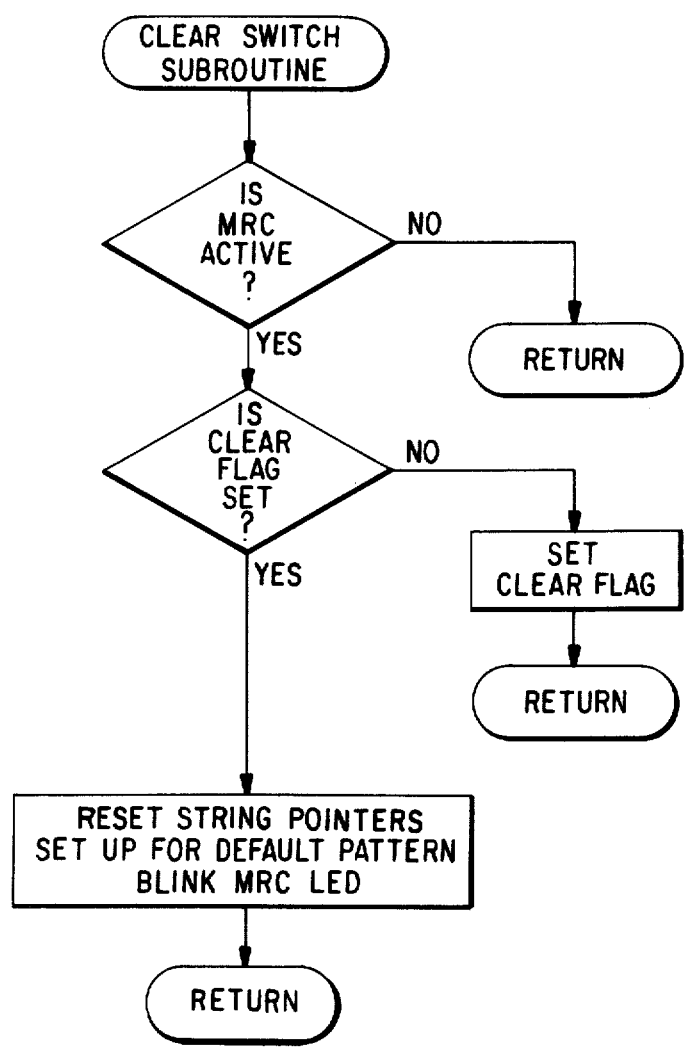
Figure 4:
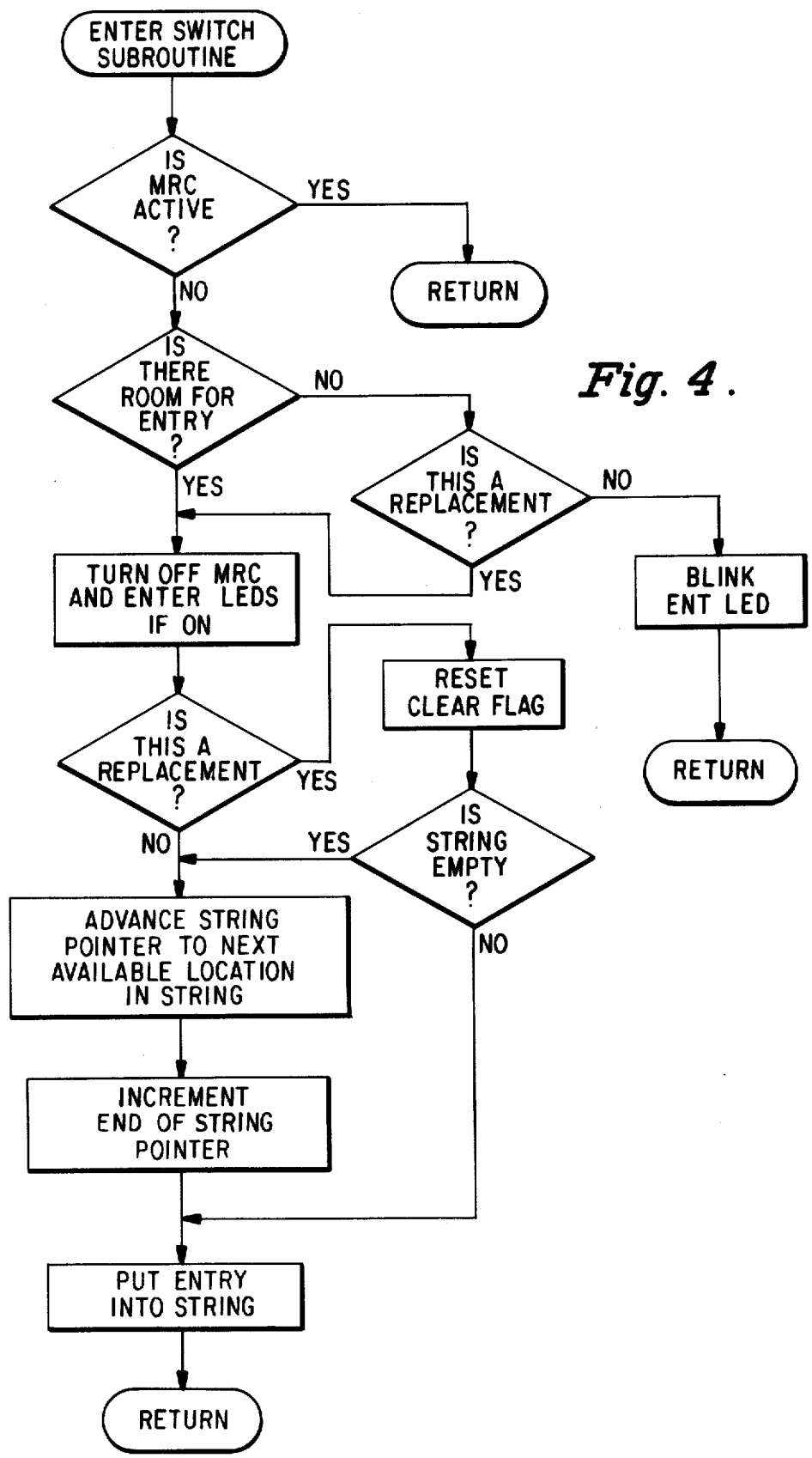

FIGS. 4, 5 and 6 are flowcharts of the subroutines set forth in the APPENDIX and will be described hereinafter. However, before proceeding with a discussion of those flowcharts, certain definitions of variables and registers utilized in the subroutines set forth in the APPENDIX will be given. The variable STRPTR is used as a pointer which is set by the program to point to a location within the pattern string memory. Typically, this pointer is incremented either in response to successive actuations of the MRC switch 50 or as sewing progresses through the string. The variable STRFIN is a pointer which identifies the next free place in the string, i.e., the location within the pattern string memory closest to the beginning thereof which is available to accept an entry. Thus, both STRPTR and STRFIN can have values between and including STRBGN and STREND. The register STRFLG contains the string flags and each bit position within the STRFLG register corresponds to a particular function. For example, there is an MRC flag bit position within the STRFLG register which is set to ONE whenever the MRC switch 50 is actuated. Also, there is a CLR flag bit position which is set to ONE when the CLR switch 52 has been actuated once.

Referring now to FIG. 4, shown therein is a flowchart for the subroutine when the ENT switch 48 has been actuated. The ENT switch 48 should be actuated after a desired pattern and its alteration function commands have been selected for entry into the string, either as the last entry in the string or as a replacement for a previous entry. The selection of a pattern clears all the flags so that the MRC flag bit within the STRFLG register should not be set. If it is set, this indicates an improper actuation of the ENT switch 48 and the subroutine returns to the main program. The subroutine then checks to see whether there is room in the string for an entry. If STRFIN is less than or equal to STREND, then there is room. If there is no room, the subroutine checks the CLR bit position in STRFLG to see if this entry is a replacement. If not, the LED associated with the ENT switch 48 is caused to blink to indicate that there is no room for an entry into the string. If the entry is appropriate, the MRC and ENT LEDs are turned off and if the entry is a replacement then the CLR flag bit position in STRFLG is reset. If the string isn't empty, which is the case if STRFIN does not equal STRBGN, then the replacement entry is placed in the string at the location designated by STRPTR. If the entry is not a replacement or if the string is empty and the entry is a replacement, then STRPTR is advanced to STRFIN and then STRFIN is incremented. The entry is then placed into the string at the location designated by STRPTR and the subroutine returns to the main program.

Referring now to FIG. 5, shown therein is a flowchart for the subroutine which responds to actuation of the MRC switch 50. First the CLR flag bit position in STRFLG is reset. If the string is empty, which is the case if STRFIN equals STRBGN, the LED 46 associated with the MRC switch 48 is caused to blink to indicate that the string is empty and the subroutine returns to the main program. If the string is not empty, the MRC flag bit position in STRFLG is checked to see if it has already been set. If the MRC flag has not been set, STRPTR is set to STRBGN. If the MRC flag has been set and some of the string has been sewn, then STRPTR is set to STRBGN. If none of the string has been sewn, STRPTR is incremented. If STRPTR reaches STRFIN, then it is reset back to STRBGN. Thus, repeated actuations of the MRC switch 50 cause the pointer to sequence through the string. In any event, the MRC flag bit position in STRFLG is set and the program sets up for whatever pattern in the string STRPTR is pointing to and the subroutine then returns to the main program.

Referring now to FIG. 6, shown therein is a flowchart for the subroutine which responds to actuations of the CLR switch 52. This switch should only be actuated sometime after the MRC switch 50 has been actuated. If not, then the subroutine returns to the main program. If the MRC flag bit position in STRFLG is set, the CLR flag bit position in STRFLG is checked to see if it is set. If not, it is set and the subroutine returns to the main program. If it had been set, STRPTR and STRFIN are both set to STRBGN. This clears the string. The sewing machine is then set to some arbitrary default pattern, for example, straight stitch, and the LED associated with the MRC switch 50 is caused to blink. The subroutine then returns to the main program.

Accordingly, there has been disclosed an electronically controlled sewing machine arranged to sew a sequence of stitch patterns with selective alterations thereto and wherein individual patterns within the sequence may be replaced. It is understood that the above-described embodiment is merely illustrative of the application of the principles of this invention. Numerous other embodiments may be devised by those skilled in the art without departing from the spirit and scope of this invention, as defined by the appended claims.

MAIN PROGRAM

```
ASMB,L
      NAM   FRED1
      ENT   RESR,SAVR
      ENT   TRANS,PROG
      EXT   READ,FLOW,FEDBK,DSPLY,CLRIO
      EXT   .DTA.,.DIO.,.RIO.,.IIO.,ISSW,.IOR.,.IOC.
      COM   CNTS1(2),CNTS2(2),RATE(2),PAVE(2),P0(2),P1(2),P2(2)
      COM   FLC(2),KP(2),KI(2),KD(2),ESUM(2),ACT(2),SET(2),ERR1(2)
      COM   M/P
      COM   NRS,N,MI
      COM   TRAN,NDSPL
```

```
           COM NFLOW,M
           CLF 00
           JSB CLRIO
           DEF *+1
    A1     LDA OUT
           CLB
           JSB .DIO.
           DEF A2
           DEF A3
           JSB .DTA.
    A3     JMP A4
    A2     ASC 11,("INPUT FLC,P0,P1,P2")
    A4     LDA IN
           CLB,INB
           JSB .DIO.
           OCT 0
           DEF B1
           JSB .RIO.
           DEF FLC
           JSB .RIO.
           DEF P0
           JSB .RIO.
           DEF P1
           JSB .RIO.
           DEF P2
    B1     LDA OUT
           CLB
           JSB .DIO.
           DEF B2
           DEF B3
           JSB .DTA.
    B3     JMP B4
    B2     ASC 15,("INPUT M CONTROL CSTS KPM,K")
    B4     LDA IN
           CLB,INB
           JSB .DIO.
           OCT 0
           DEF C1
           JSB .RIO.
           DEF KP
           JSB .RIO.
           DEF KI
           JSB .RIO.
    C1     LDA OUT
           CLB
           JSB .DIO.
           DEF C2
           DEF C3
           JSB .DTA.
    C3     JMP C4
    C2     ASC 7,("INPUT NRS ")
    C4     LDA IN
           CLB,INB
           JSB .DIO.
           OCT 0
           DEF D1
           JSB .IIO.
           DEF NRS
```

```
D1      LDA OUT
        CLB
        JSB .DIO.
        DEF D2
        DEF D3
        JSB .DTA.
D3      JMP D4
D2      ASC 17,("INPUT 0 FOR M,1 FOR P CONTROL ")
D4      LDA IN
        CLB,INB
        JSB .DIO.
        OCT 0
        DEF E1
        JSB .IIO.
        DEF M/P
E1      LDA OUT
        CLB
        JSB .DIO.
        DEF E2
        DEF E3
        JSB .DTA.
E3      JMP E4
E2      ASC 24,("INPUT SETPOINT 0 TO INITIALIZE,1 TO CONTINUE")
E4      LDA IN
        CLB,INB
        JSB .DIO.
        OCT 0
        DEF G1
        JSB .RIO.
        DEF SET
        JSB .IIO.
        DEF INIT
G1      LDA OUT
        CLB
        JSB .DIO.
        DEF G2
        DEF G3
        JSB .DTA.
G3      JMP G4
G2      ASC 23,("INPUT NFLOW,1 FOR FLOW PROGRAM,0 FOR OTHER")
G4      LDA IN
        CLB,INB
        JSB .DIO.
        OCT 0
        DEF G5
        JSB .IIO.
        DEF NFLOW
G5      LDA NFLOW
        SLA
        JMP F0
        JMP F1
F0      LDA OUT
        CLB
        JSB .DIO.
        DEF L2
        DEF L3
        JSB .DTA.
L3      JMP L4
L2      ASC 9,("INPUT SET2,RAT")
```

```
L4      LDA IN
        CLB,INB
        JSB .DIO.
        OCT 0
        DEF L5
        JSB .RIO.
        DEF SET2
        JSB .RIO.
        DEF RAT
L5      DLD RAT
        FDV NCTS
        DST CONST
F1      LDA OUT
        CLB
        JSB .DIO.
        DEF F2
        DEF F3
        JSB .DTA.
F3      JMP F4
F2      ASC 24,(" INPUT NDSPL(=1 FOR DSPLY,=0 FOR OTHER MODE)")
F4      LDA IN
        CLB,INB
        JSB .DIO.
        OCT 0
        DEF E5
        JSB .IIO.
        DEF NDSPL
E5      NOP
        CLA
        OTA 1
        STC 1,C
        LDA INIT
        SZA                 IF A=0 INITIALIZE, OTHERWISE CONTINUE
        JMP CONT2
        CLA
        CLB
        DST ESUM
CONT2   NOP
        CLA
        STA N
        STA TRAN
        STA NBUFF
        STA M
        LDA PTR
        STA PT
        LDA N1
        ADA N1
        CMA,INA
        ADA PTR
        ADA NTS
        ADA NTS
        ADA NTS
        ADA NTS
        STA END
        DLD SET
        DST TSET
        LDA CHNL1,I
        STA INT
        LDA LOC2
```

```
        STA CHNL2
        ORB
LINK2   DEF READ
        ORR
        STF 00
        STC CHNL2,C
        CLC CHNL3
        CLC CHNL4
        CLC CHNL5
        CLC CHNL6
        NOP
        NOP
EXEC    NOP
        LDA NDSPL
        SZA
        JMP DSPL
        LDA N5           TRANSIENT MODE
        JSB ISSW
        SSA
        JMP V1
        JMP V3
V1      LDA N1
        STA TRAN
V3      LDA NFLOW
        SZA
        JMP V2
        JMP DSPL
V2      LDA N6
        JSB ISSW
        SSA
        STA M
DSPL    LDA NBUFF
        SZA
        JSB TTY1
        LDA N
        NOP
        NOP
        CPA NRS
        JSB TTY
        JMP EXEC
TTY     NOP
        CLA
        STA N
        DLD RATE
        DST TRATE
        DLD PAVE
        DST TPAVE
        LDA OUT
        CLB
        JSB .DIO.
        DEF FMT
        DEF EOL
        DLD TRATE
        JSB .IOR.
        DLD TPAVE
        JSB .IOR.
EOL     JSB .DTA.
        NOP
        NOP
        JMP TTY,I
```

```
STATS  NOP
       LDA OPSTS
       IOR OUT
       JSB .IOC.
       NOP
       SSA
       JMP *-3
       JMP STATS,I
TRANS  NOP
       DLD RATE
       DST PT,I
       ISZ PT
       ISZ PT
       DLD PAVE
       DST PT,I
       ISZ PT
       ISZ PT
       LDA END         CHECK FOR END OF BUFFER
       CMA,INA
       ADA PT
       SSA
       JMP TR1
       CLA
       STA TRAN
       LDA N1
       STA NBUFF
       CLA
       STA N
TR1    JMP TRANS,I
TTY1   NOP
       CLA
       STA NBUFF
       LDA PTR
       STA PT
       LDA OUT
       CLB
       JSB .DIO.
       DEF FMT
       DEF A7
A6     DLD PT,I
       JSB .IOR.
       ISZ PT
       ISZ PT
       DLD PT,I
       JSB .IOR.
       ISZ PT
       ISZ PT
       LDA END
       CMA,INA
       ADA PT
       SSA
       JMP A6
A7     JSB .DTA.
       CLA
       STA N
       LDA PTR
       STA PT
       JMP TTY1,I
```

```
PROG    NOP
        DLD SET
        FAD CONST
        DST SET
        FSB SET2
        SSA
        JMP T1
        CLA
        STA M
        DLD TSET
        DST SET
T1      JMP PROG,I
FMT     ASC 9,(1X,F7.3,1X,F7.3)
LOC2    JSB LINK2,I
SAVR    NOP
        STA SAVEA
        STB SAVEB
        ERA,ALS
        SOC
        INA
        STA SAVEO
        JMP SAVR,I
RESR    NOP
        LDA SAVEO
        CLO
        SLA,ELA
        STO
        LDA SAVEA
        LDB SAVEB
        JMP RESR,I
PTR     DEF START
OPSTS   OCT 40000
KPM     BSS 2
KIM     BSS 2
KDM     BSS 2
KPP     BSS 2
KIP     BSS 2
KDP     BSS 2
N5      DEF 5
OUT     DEF 7B
IN      DEF 1B
NONE    DEF 0
N1      DEF 1
N2      DEF 2
N3      DEF 3
N4      DEF 4
N6      DEF 6
INIT    BSS 1
INT     BSS 1           STORE CONTENT OF MEMORY ADD. 11
SAVEA   BSS 1
SAVEB   BSS 1
SAVEO   BSS 1
TRATE   BSS 2
TPAVE   BSS 2
START   BSS 200
END     BSS 1
PT      BSS 1
NBUFF   BSS 1
NTS     DEC 50
```

```
TSET  BSS 2
SET2  BSS 2
RAT   BSS 2
CONST BSS 2
NCTS  DEC 300.0
CHNL1 EQU 11B
CHNL2 EQU 10B
CHNL3 EQU 12B
CHNL4 EQU 15B
CHNL5 EQU 13B
CHNL6 EQU 14B
      END
```

READ

```
ASMB,L
      NAM READ
      ENT READ
      EXT .PACK,ISSW
      EXT  FLOW,FEDBK,DSPLY
      EXT SAVR,RESR
      EXT TRANS,PROG
READ  NOP
      COM CNTS1(2),CNTS2(2),RATE(2),PAVE(2),P0(2),P1(2),P2(2)
      COM FLC(2),KP(2),KI(2),KD(2),ESUM(2),ACT(2),SET(2), ERR1(2)
      COM M/P
      COM NRS,N,NI
      COM TRAN,NDSPL
      COM NFLOW,M
      CLF 0
      JSB SAVR
      LIB CHNL,C         INPUT 16 LSB BITS FROM TRANSDUCER
      STB AA
      LDA LOC3
      STA CHNL
      JSB RESR
      STC CHNL,C
      STF 0
      JMP READ,I
READA NOP
      CLF 0
      JSB SAVR
      LDB AA
      LIA CHNL,C         INPUT 5 MSB FROM TRANSDUCER
      CMA                CONVERT FROM NEGATIVE TRUE LOGIC
      CMB
      AND MASK
      RBL
      CLE,ERA
      ERB
      JSB .PACK          CONVERT BINARY DATA TO FLOATING POINT
      DEC 31
      DST CNTS1
      LDA LOC1
      STA CHNL
      JSB RESR
      STC CHNL,C
      STF 0
      JMP READA,I
```

```
LOC2   JSB LINK2,I
LOC1   JSB LINK3,I
LOC3   JSB LINK4,I
LOC4   JSB LINK5,I
       ORB
LINK2  DEF READ
LINK3  DEF DATA2
LINK4  DEF READA
LINK5  DEF DATAA
       ORR
DATA2  NOP
       CLF 0
       JSB SAVR
       NOP
       LIB CHNL,C       INPUT LSB
       STB AA
       LDA LOC4
       STA CHNL
       JSB RESR
       STC CHNL,C
       STF 0
       JMP DATA2,I
DATAA  NOP
       CLF 0
       JSB SAVR
       LDB AA
       LIA CHNL,C       INPUT MSB
       CMA              NEGATIVE TRUE LOGIC
       CMB
       AND MASK
       RBL
       CLE,ERA
       ERB
       JSB .PACK        CONVERT TO FLOATING POINT
       DEC 31
       DST CNTS2        CHECK FOR PROPER TIMING CNTS2>CNTS1
       DLD ERR1
       SZA
       JMP A1
       DLD CNTS1
       FSB CNTS2
       SSA
       JMP T1
       DLD CNTS2
       DST CNTS1
       LDA LOC1
       STA CHNL
       JSB RESR
       STC CHNL,C
       STF 0
       JMP DATAA,I
A1     DLD CNTS1
       FSB CNTS2
       SSA,RSS
       JMP T1
       DLD CNTS2
       DST CNTS1
       LDA LOC1
       STA CHNL
```

```
        JSB RESR
        STC CHNL,C
        STF 0
        JMP DATAA,I
T1      LDA LOC2
        STA CHNL
        NOP
        JSB FLOW            CALCULATE RATE AND PAVE
        NOP
        LDA M/P              =1 FOR MASS FLOW CONTROL, 1FOR PRESSURE
        SZA                  IF A=0, DO P+2,OTHERWISE P+1
        JMP CONT3
        DLD RATE
        DST ACT
        JMP CONT4
CONT3   DLD PAVE
        DST ACT
CONT4   LDA NDSPL
        SLA
        JMP TR2              NDSPL=1
        LDA M
        SSA
        JSB PROG
TR4     JSB FEDBK           CALCULATE AND OUTPUT 16BIT DUTY CYCLE
        LDA TRAN
        SLA
        JSB TRANS            TRAN=1
        JMP TR3              TRAN =0
TR2     JSB FEDBK
        JSB DSPLY
TR3     ISZ N                INCREMENT N
        JSB RESR
        STC CHNL,C
        STF 0
        JMP DATAA,I
MASK    OCT 77
CHNL    EQU 10B
AA      BSS 1
N6      DEF 6
        END
END$
```

FLOW

```
ASMB,L
        NAM FLOW
        ENT FLOW
FLOW    NOP
        COM CNTS1(2),CNTS2(2),RATE(2),PAVE(2),P0(2),P1(2),P2(2)
        COM FLC(2),KP(2),KI(2),KD(2),ESUM(2),ACT(2),SET(2),ERR1(2)
        DLD P2
        FMP CNTS1
        FAD P1
        FMP CNTS1
        FAD P0
        DST PA              PA=P0+P1*CNTS1+P2*CNTS1*CNTS1
        DLD P2
        FMP CNTS2
        FAD P1
```

```
        FMP CNTS2
        FAD P0
        DST PB          PB=P0+P1*CNTS2+P2*CNTS2*CNTS2
        DLD ERR1
        SZA,RSS
        JMP A1
        DLD PB
        FSB PA
        FMP FLC
        DST RATE        RATE=FLC*(PA-PB)
        DLD PA
        FAD PA
        FSB PB
        DST PAVE
        JMP A2
A1      DLD PA
        FSB PB
        FMP FLC
        DST RATE
        DLD PB
        FAD PB
        FSB PA
        DST PAVE
A2      NOP
        JMP FLOW,I
CST1    DEC 3.3333E-1
PA      BSS 2
PB      BSS 2
        END
END$
```

FEEDBACK

```
ASMB,L
        NAM FEDBK
        ENT FEDBK
FEDBK   NOP
        COM CNTS1(2),CNTS2(2),RATE(2),PAVE(2),P0(2),P1(2),P2(2)
        COM FLC(2),KP(2),KI(2),KD(2),ESUM(2),ACT(2),SET(2),ERR1(2)
        DLD ACT1
        FMP .9
        DST ACT1
        DLD ACT
        FMP .1
        FAD ACT1
        DST ACT1
        NOP
        NOP
        NOP
        NOP
        DLD SET
        FSB ACT1
        DST E           E=SETPOINT-ACTUAL
        FAD ESUM
        DST ESUM        ESUM=E+ESUM
        SSA
        JMP LIMIT
        DLD CST2
        FSB ESUM
```

```
        SSA
        JMP  LIM2
LIM     NOP
        DLD  E
        FMP  KP
        DST  PROP              PROP=E*KP*ERR1/ACT1
        DLD  ESUM
        FMP  KI
        DST  INTEG             INTEG=ESUM*KI*ERR1/PAVE1*FLC*DT
        FAD  PROP
        SSA
        JMP  NEG
        FIX
        FLT
RET     DST  ERR1
        FAD  OFSET
        FIX
OUTPT   CMA
        OTA  CHL
        JMP  FEDBK,I
NEG     CLA
        CLB
        JMP  RET
LIMIT   CLA
        CLB
        DST  ESUM
        JMP  LIM
LIM2    DLD  CST2
        DST  ESUM
        JMP  LIM
OFSET   DEC  7.5E3
E       BSS  2
PROP    BSS  2
INTEG   BSS  2
ACT1    BSS  2
.1      DEC  .125
.9      DEC  .8750
CST2    DEC  65E1
CHL     EQU  10B
ERROR   BSS  2
        END
```

We claim:

1. An electronically controlled multiple pattern sewing machine including a central control system having a memory storing stitch pattern information, pattern selection input means for transmitting to said central control system a pattern selection signal identifying a selected pattern to be sewn by the sewing machine, alteration function input means for transmitting to said central control system selected pattern alteration function commands associated with a selected pattern on an individual basis to cause said central control system to alter the stored stitch pattern information in accordance with said selected pattern alteration function commands so as to sew a selectively altered version of a selected pattern, and pattern string memory means for storing the sequence of entries each comprising a respective pattern selection signal and associated selected pattern alteration function commands.

2. The sewing machine according to claim 1 further including means for replacing a selected individual entry in said pattern string memory means with another such entry.

3. The sewing machine according to claim 1 wherein said pattern string memory means includes a plurality of addressable memory locations arranged in a predetermined order and further including:

display means for displaying a selected pattern and associated selected pattern alteration functions;

first pointer means for identifying the address of a pattern string memory means location;

second pointer means for identifying the address of the pattern string memory means location closest to the beginning of said order which is available to accept an entry;

an operator actuable enter switch; and means responsive to actuation of said enter switch for (a) advancing the contents of said first pointer means to the contents of said second pointer means, (b) advancing the contents of said second pointer means to the next address in said order, and (c) inserting in said pattern string memory means at the address identified by said first pointer means the pattern selection signal and associated pattern alteration function commands corresponding to the display of said display means.

4. The sewing machine according to claim 3 further including:

an operator actuable memory recall switch;

means responsive to actuation of said memory recall switch for setting the contents of said first pointer means to the first address in said order;

means responsive to each successive actuation of said memory recall switch for advancing the contents of said first pointer means to a successive address in said order; and means responsive to actuation of said memory recall switch for transmitting to said central control system the contents of the pattern string memory means location identified by the contents of said first pointer means.

5. The sewing machine according to claim 4 further including:

an operator actuable clear switch;

a memory recall flag;

a clear flag;

means responsive to actuation of said memory recall switch for setting said memory recall flag;

means responsive to actuation of said clear switch when said memory recall flag is set for setting said clear flag;

means responsive to actuation of said enter switch when said clear flag is set for inserting in said pattern string memory means at the address identified by said first pointer means the pattern selection signal and associated pattern alteration function commands corresponding to the display of said display means.

6. The sewing machine according to claim 5 further including:

means responsive to actuation of said clear switch when said clear flag is set for setting the contents of both said first and second pointer means to the first address in said order.

* * * * *